(12) United States Patent
Avganim

(10) Patent No.: US 7,549,308 B2
(45) Date of Patent: Jun. 23, 2009

(54) COMPUTER ANTI-THEFT LOCKING DEVICE WITH ACCESSORIES PROTECTING ADAPTOR

(76) Inventor: Mair Avganim, 156 Moshav Gealiya, 76885 M.P. Nachal Sorek (IL)

( * ) Notice: Subject to any disclaimer, the term of this patent is extended or adjusted under 35 U.S.C. 154(b) by 0 days.

(21) Appl. No.: 11/650,372

(22) Filed: Jan. 5, 2007

(65) Prior Publication Data

US 2008/0163654 A1     Jul. 10, 2008

(51) Int. Cl.
*E05B 69/00*     (2006.01)

(52) U.S. Cl. .................... 70/58; 70/14; 70/18

(58) Field of Classification Search ............ 70/14, 70/18, 19, 57, 58
See application file for complete search history.

(56) References Cited

U.S. PATENT DOCUMENTS

| | | | | |
|---|---|---|---|---|
| 6,182,481 | B1 * | 2/2001 | Nagy ............................ | 70/58 |
| 6,536,244 | B1 * | 3/2003 | Chang .......................... | 70/58 |
| 6,705,133 | B1 | 3/2004 | Avganim | |
| 6,763,688 | B1 * | 7/2004 | Syu .............................. | 70/14 |
| 6,854,302 | B2 * | 2/2005 | Zapushek et al. ............. | 70/34 |
| 6,880,373 | B2 * | 4/2005 | Ling ............................. | 70/58 |
| 6,968,716 | B1 * | 11/2005 | Ling ............................. | 70/14 |
| 6,973,809 | B2 * | 12/2005 | Chang .......................... | 70/58 |
| 7,013,685 | B2 * | 3/2006 | Francke ........................ | 70/18 |
| 7,028,513 | B2 * | 4/2006 | Avganim ...................... | 70/18 |
| 7,073,358 | B1 * | 7/2006 | Lee .............................. | 70/58 |
| 7,237,410 | B2 * | 7/2007 | Millist ......................... | 70/58 |
| 7,308,809 | B2 * | 12/2007 | Lu ............................... | 70/58 |
| 7,331,203 | B2 * | 2/2008 | Lee .............................. | 70/14 |
| 2003/0140662 | A1 * | 7/2003 | Hsu ............................. | 70/18 |
| 2003/0200775 | A1 * | 10/2003 | Yu ............................... | 70/58 |
| 2004/0074264 | A1 * | 4/2004 | Kung et al. .................. | 70/58 |
| 2005/0199018 | A1 * | 9/2005 | Chen et al. ................... | 70/18 |

FOREIGN PATENT DOCUMENTS

| | | |
|---|---|---|
| WO | WO 00/45017 A1 | 8/2000 |
| WO | WO 03/046320 A1 | 6/2003 |
| WO | WO 2004/067887 A1 | 8/2004 |

\* cited by examiner

*Primary Examiner*—Suzanne D Barrett
(74) *Attorney, Agent, or Firm*—Blakely, Sokoloff, Taylor & Zafman

(57) ABSTRACT

An improved locking device especially for portable computers of the type comprising a lock casing connectable on the one hand to an immovable object by a safety cable, and on the other hand to the protected object intermediate a designated slot formed in a side wall of the computer. The improvement consists of a yoke-member which comprises a first portion configured to be in the engaged state, entrapped between the lock casing and the side wall. A second portion of the yoke member bridges over the lock casing, forming an enclosed hollow thereunder through which electric cables of auxiliary equipment such as mouse and keyboard are passed.

6 Claims, 10 Drawing Sheets

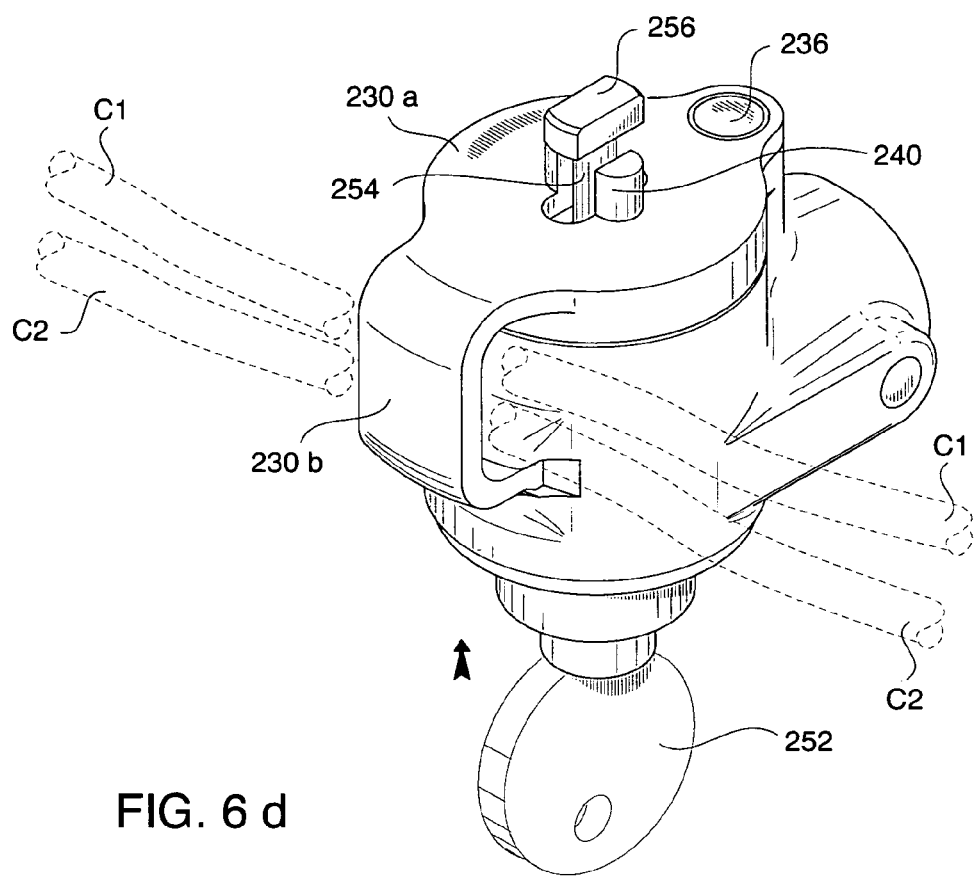
FIG. 6 d
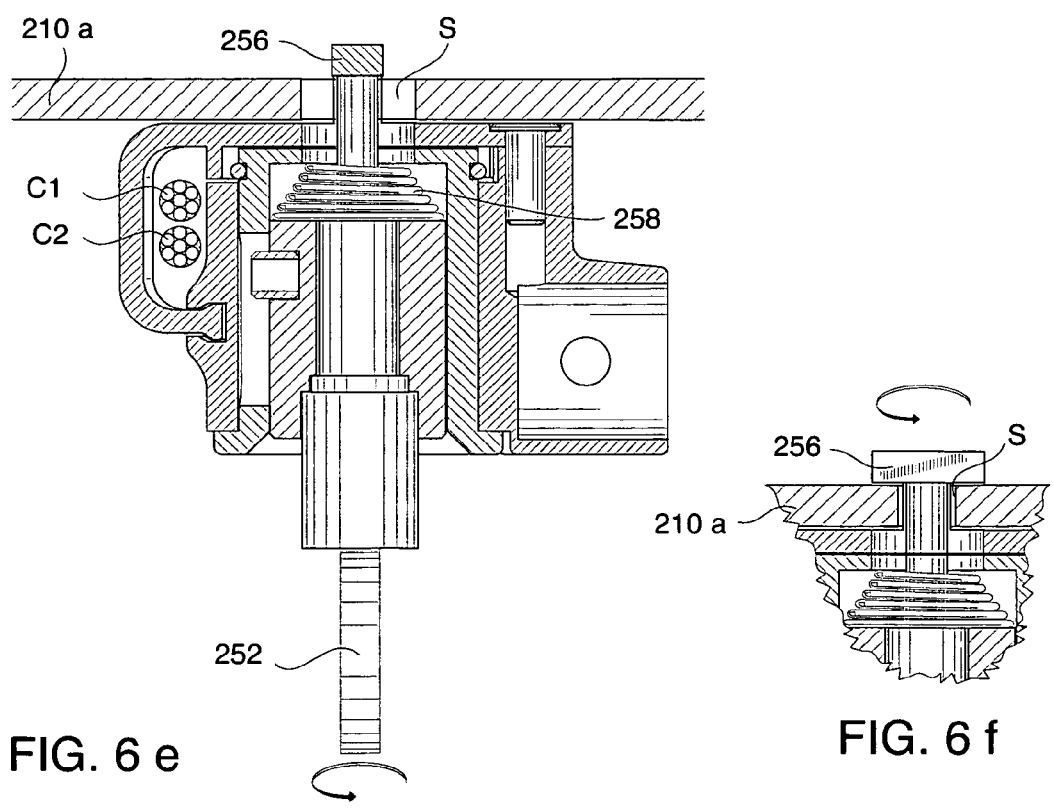
FIG. 6 e
FIG. 6 f

COMPUTER ANTI-THEFT LOCKING DEVICE WITH ACCESSORIES PROTECTING ADAPTOR

FIELD OF THE INVENTION

The present invention relates to computer anti-theft devices, particularly of the type adapted to be engaged to a designated slot formed in a side-wall of the computer housing by a rotatable T-shaped tip (or equivalent) on the one hand, and a safety cable adapted to be tied to a stationary object, on the other hand (hereinafter collectively referred to as "cable locks").

BACKGROUND OF THE INVENTION

Numerous types and designs of cable locks are available on the market place, mainly differing only by the type of their locking mechanism employed (keys, push-button, combination, etc.).

The prime object of the present invention is to extend the protection offered by the conventional locks in the sense that once locked—the removal of computer accessories such as key-board or mouse will be also prevented.

A further object of the invention is that such extended protection be attained by providing an adaptor, attachable or manipulated by the user before completing the locking operation.

It is a still further object of the invention that such adaptor be either separate or coupled to the computer lock casing. In the former case, the design of the adaptor should be as much as possible standard in order to fit different models of commercially available cable locks.

SUMMARY OF THE INVENTION

Thus provided according to a general aspect of invention is an anti-theft locking device of the type comprising a lock casing connectable on the one hand to an immovable object by a safety cable, and on the other hand to the protected object intermediate a designated slot formed in a side wall of the protected object, and a locking mechanism for selectively engaging and disengaging the lock casing to and from said side wall, characterized in that a yoke-member is provided comprising a first portion configured to be, in the engaged state, entrapped between the lock casing and the said side wall, and a second portion bridging over the lock casing and forming an enclosed hollow thereunder.

BRIEF DESCRIPTION OF THE DRAWINGS

These and additional constructional features and advantages of the invention will be more fully understood in the light of the ensuing description of several preferred embodiments thereof, given by way of example only, with reference to the accompanying drawings wherein.

DETAILED DESCRIPTION OF THE PREFERRED EMBODIMENTS

Figure 1:
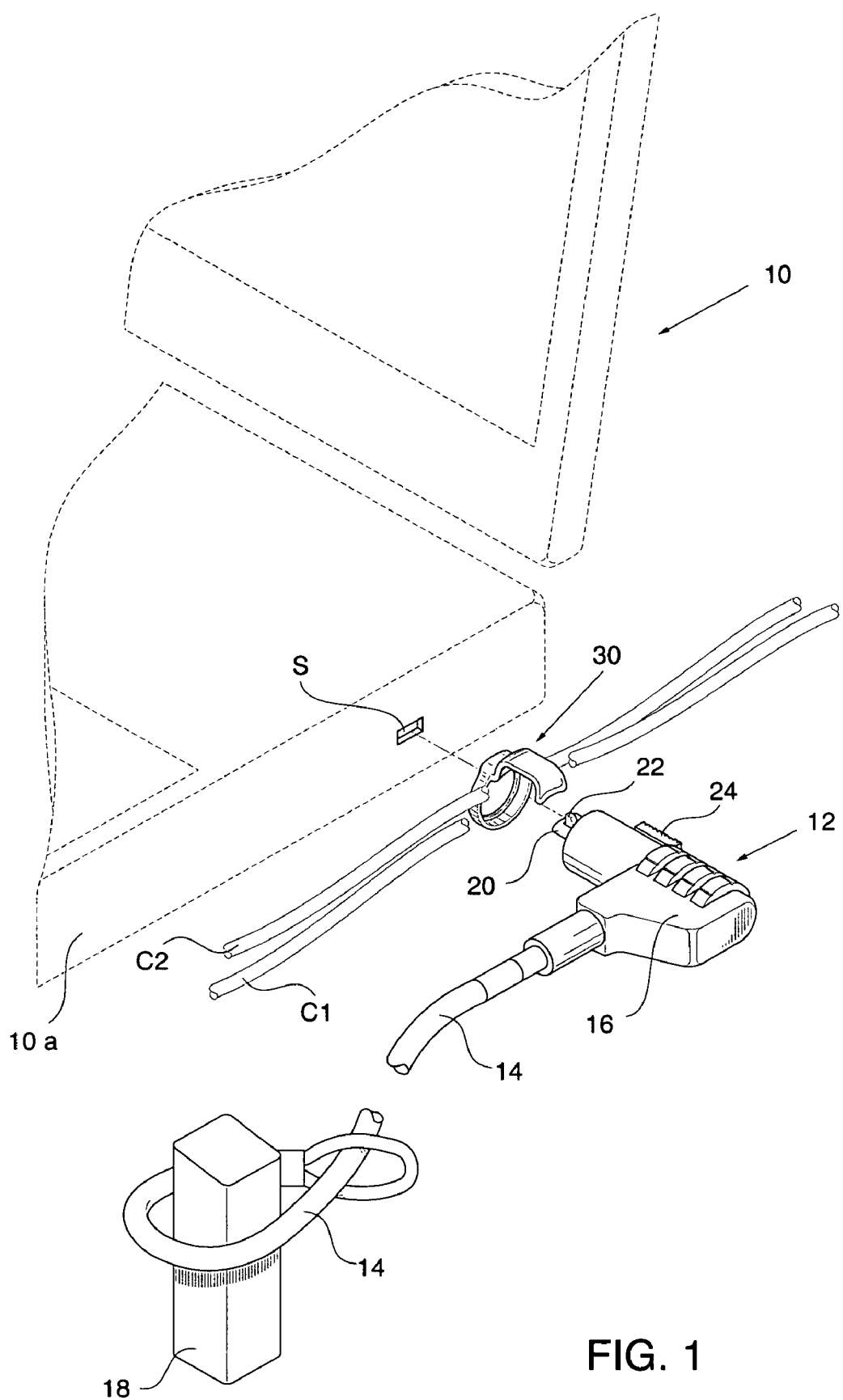
FIG. 1 is a schematic, perspective exploded view, relating to a first preferred embodiment of the invention.

Referring to FIG. 1, 10 denotes a portable computer having a side wall 10a formed with designated slot S as commonly known with respect to most models.

Further shown is a commercially available combination cable lock 12. It consists of a safety cable 14 extending from lock casing 16 which is adapted to be tied to a stationary object 18 such as around a table leg.

In the present example, tip 20, which needs to be inserted into the slot S and arrested therein, is in the form of detent 22 retractable into the tip 20 once the combination is correctly set (that is by the authorized owner), by manipulating spring urged slider 24. The retraction of the detent 22 allows the insertion of the tip into the slot S. The locking of the device 12 to the computer housing side wall 10a is perfected by relieving the slider 24. The detent resumes its projected position whereby retrieval of the tip 20 from the slot is prevented. The combination wheels are then rotated away from the previous, pre-set arrangement.

The instant invention proposes to attain additional security, by enabling the arrest of auxiliary equipment operating cables $C_1$, $C_2$, say, of the mouse and perhaps and additional key-board (not shown).

Figure 2:
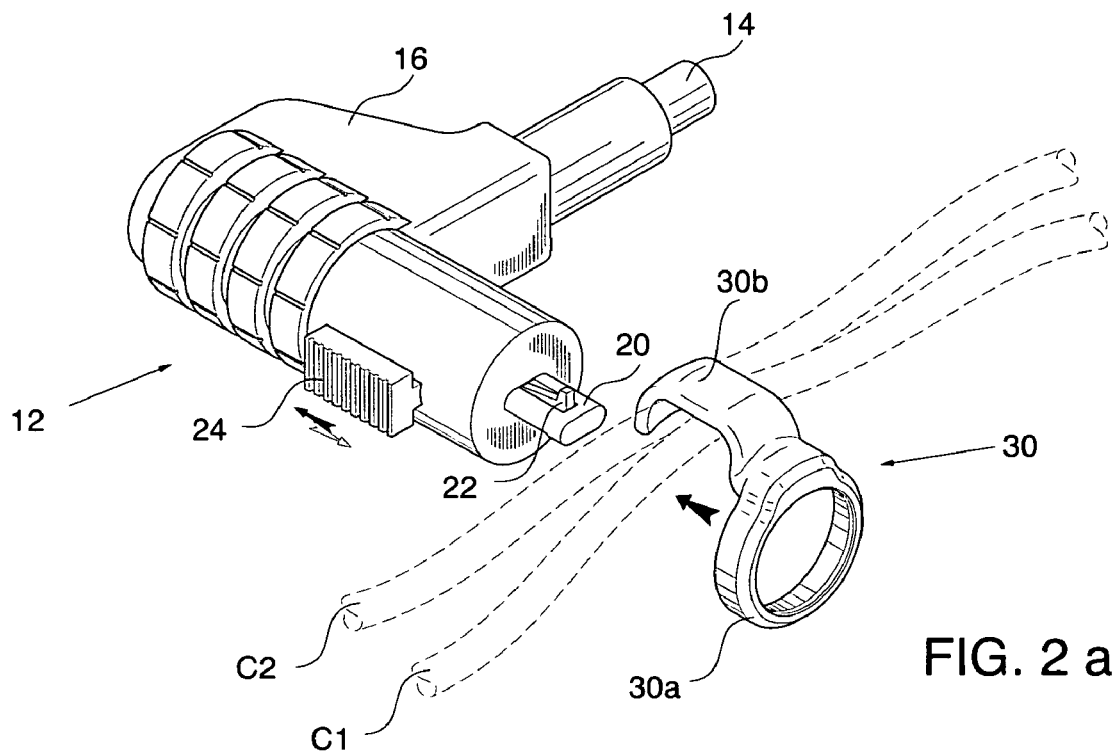
FIGS. 2a-2d illustrates sequence of stages to complete the mounting of the lock of FIG. 1.
Figure 2:
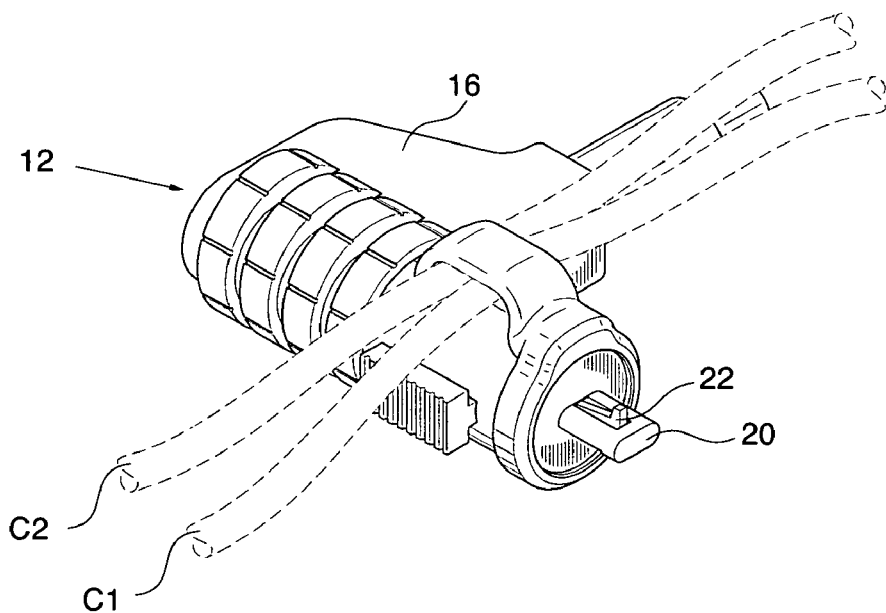
Figure 2:
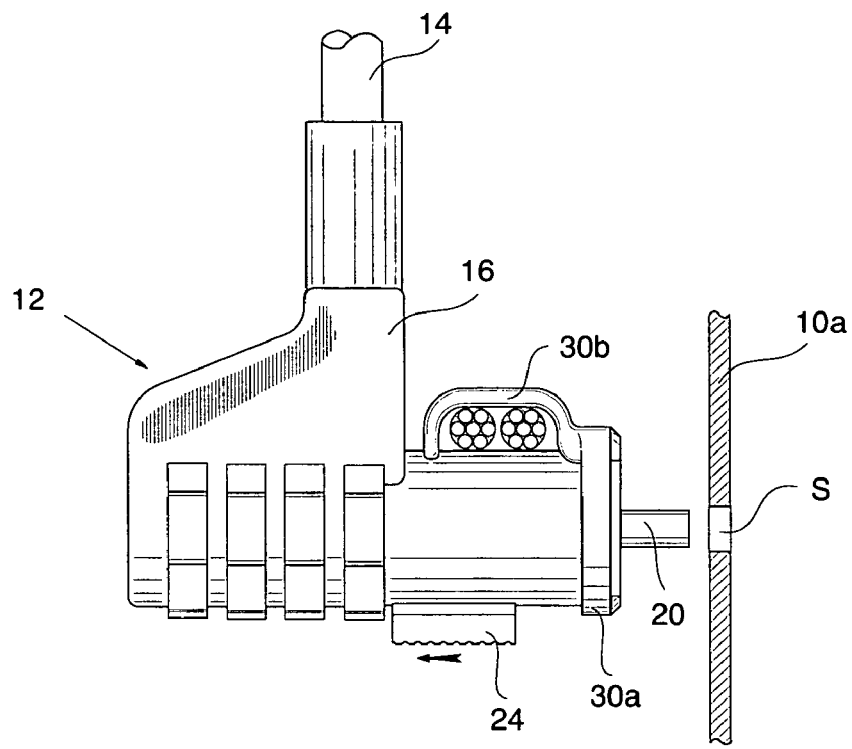
Figure 2:
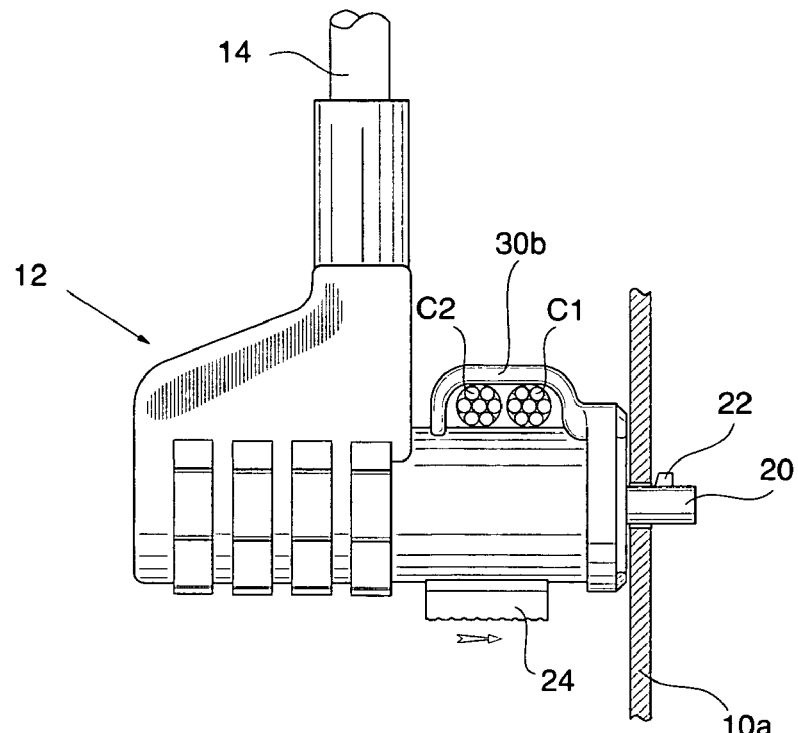

This is achieved by providing a yoke-member 30 comprised of a first portion 30a and a second portion 30b. The first portion 30a is ring-shaped having a stepped shoulder, configured to fit over the (circular) proximal portion of the lock casing (see FIG. 2b).

The second portion 30b is elongated, resembling a bridge which extends from the rim of the ring-shaped first portion upwards, continues parallel to axis of the lock casing and terminates downwards at the distal end thereof, touching the outer surface of the lock casing.

Obviously, should the lock casing be differently designed regarding its outer contour thereof, the portion 30a would be designed accordingly.

The procedure of arresting the cables $C_1$ and $C_2$ simultaneously with mounting and locking the device 12 is clearly depicted in FIGS. 2a to 2d and need not be explained in greater detail. The major point is that the yoke member 30, with the cables passing under the arc of the bridging portion 30b, is arrested between the side-wall 10a of the computer 10, and the leading end of the lock casing, and there is no 10 need for additional fastening means.

Figure 3:
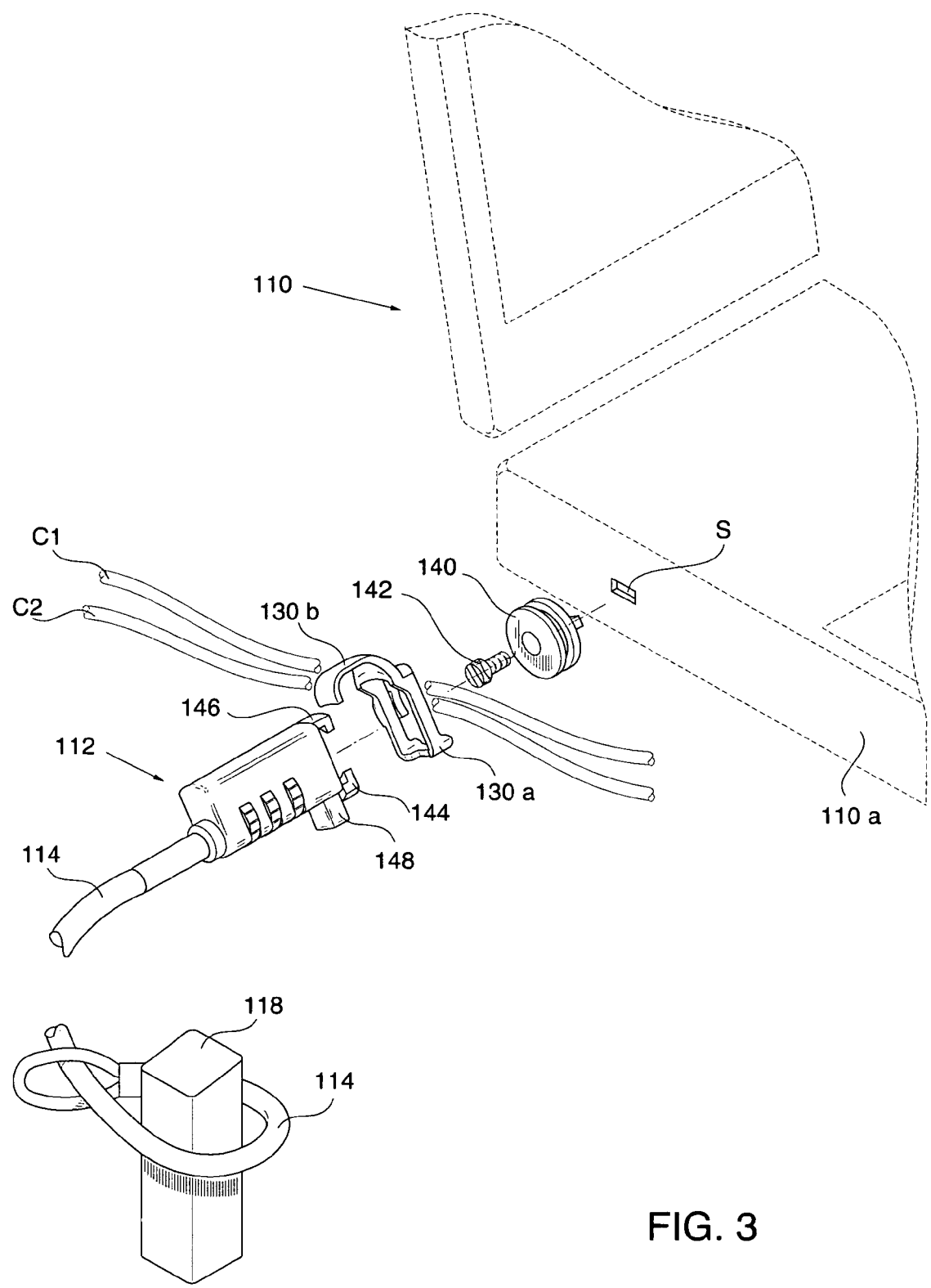
FIG. 3 is a schematic, perspective exploded view relating to a second preferred embodiment of the invention.
Figure 4:
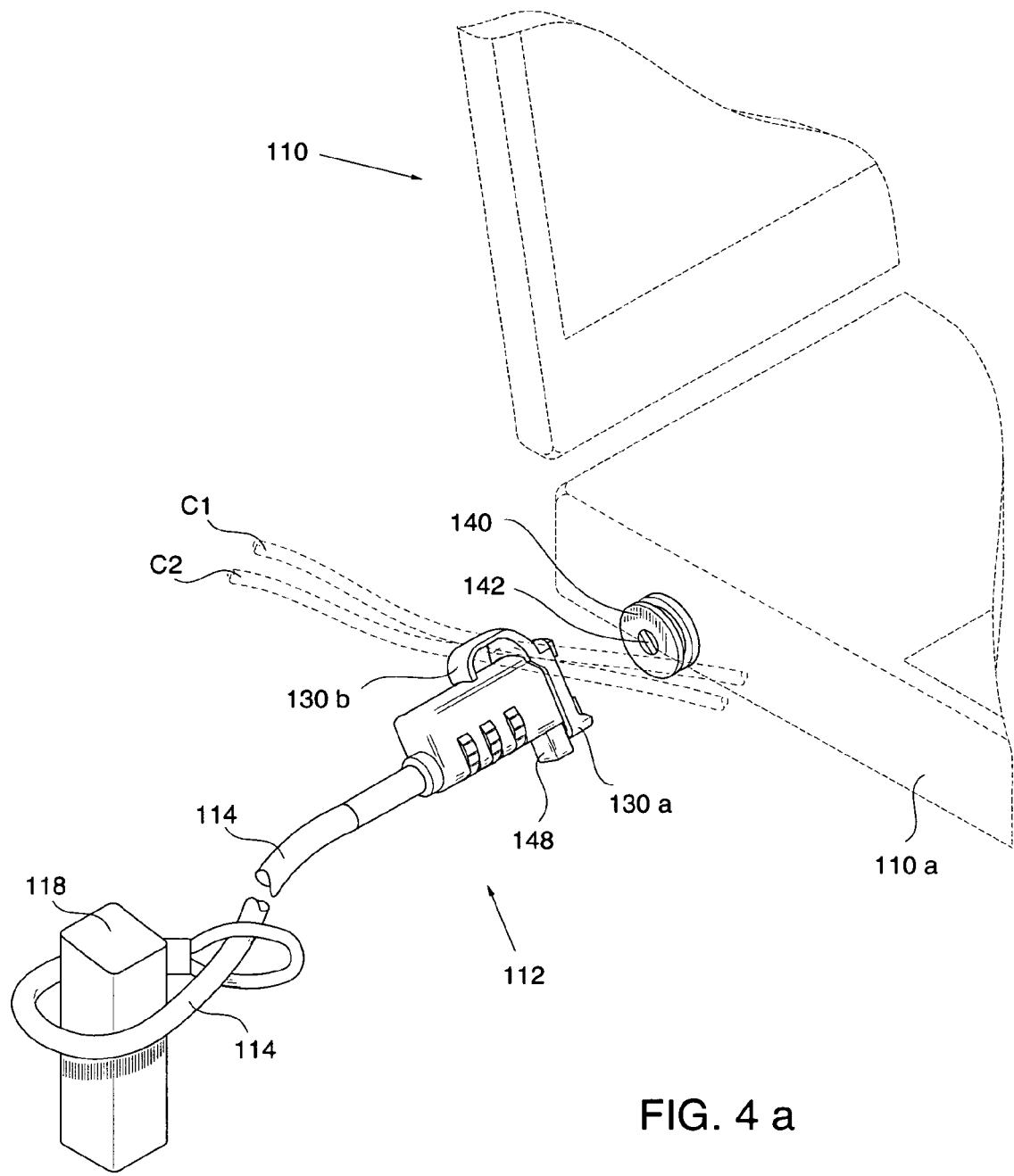
FIGS. 4a-4d illustrate stages of using the lock of FIG. 3.
Figure 4:
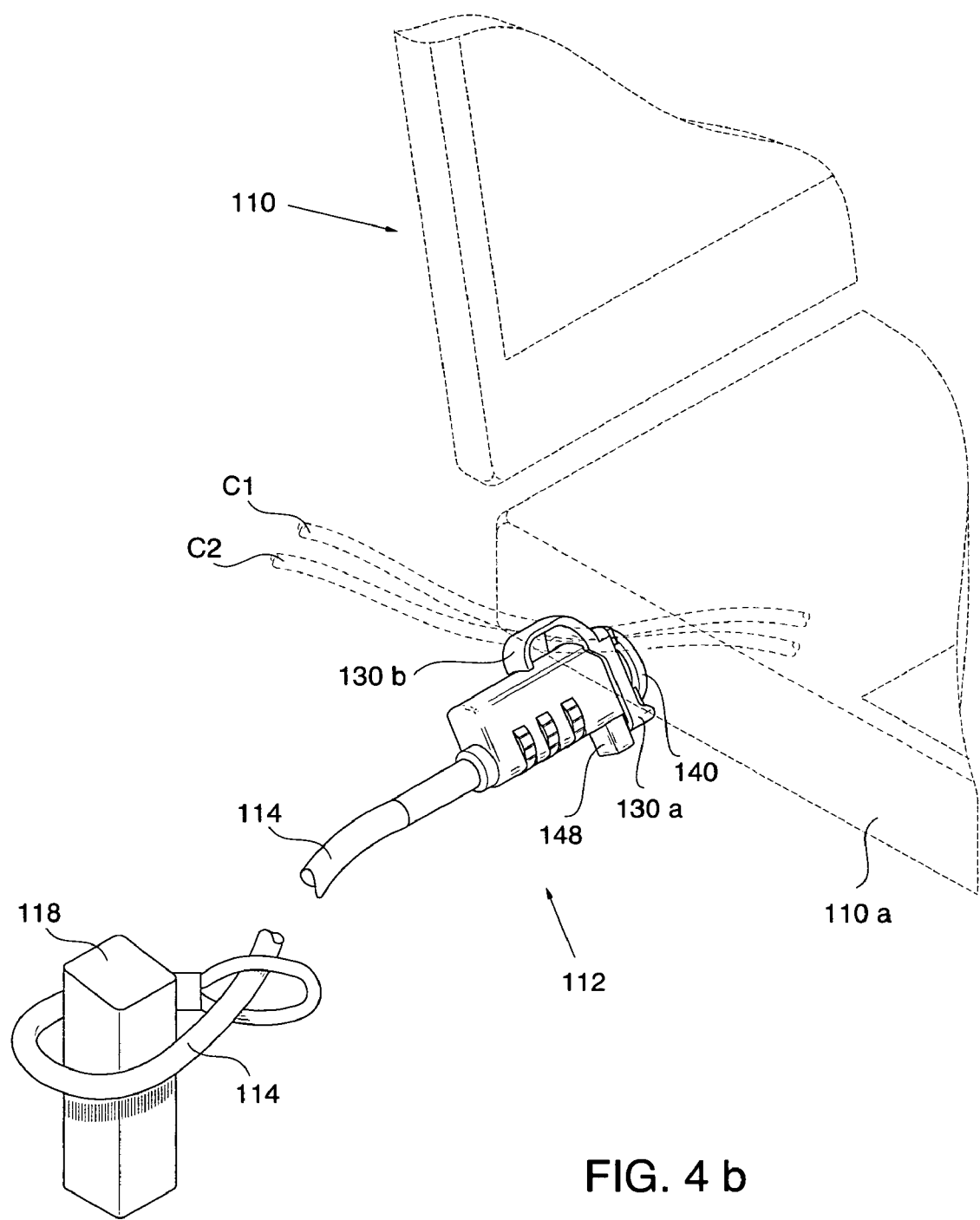
Figure 4:
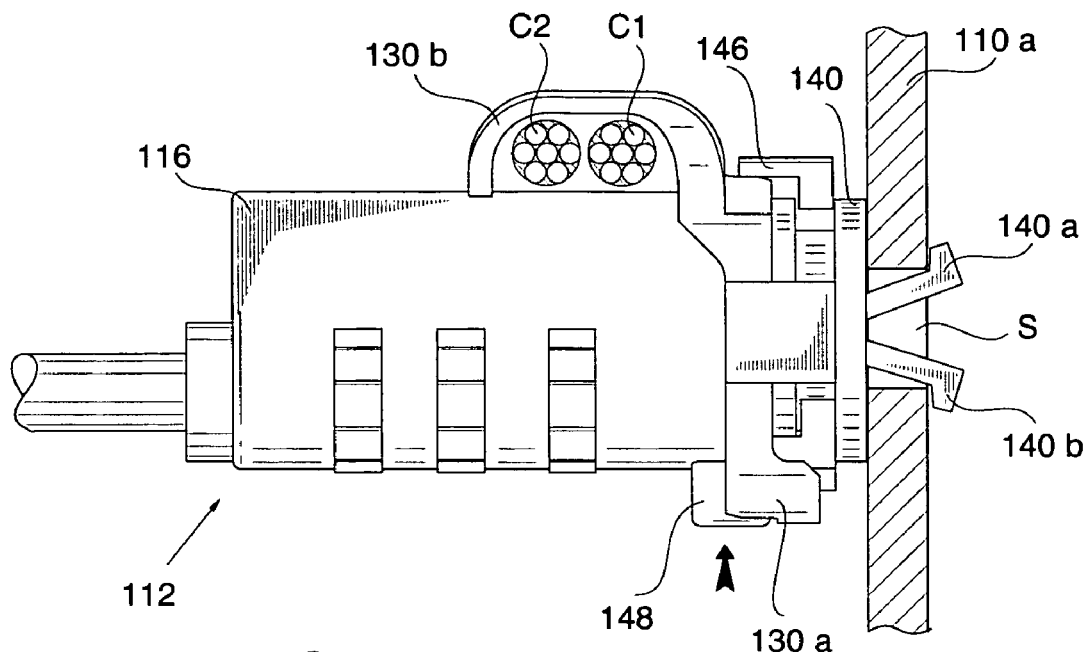
Figure 4:
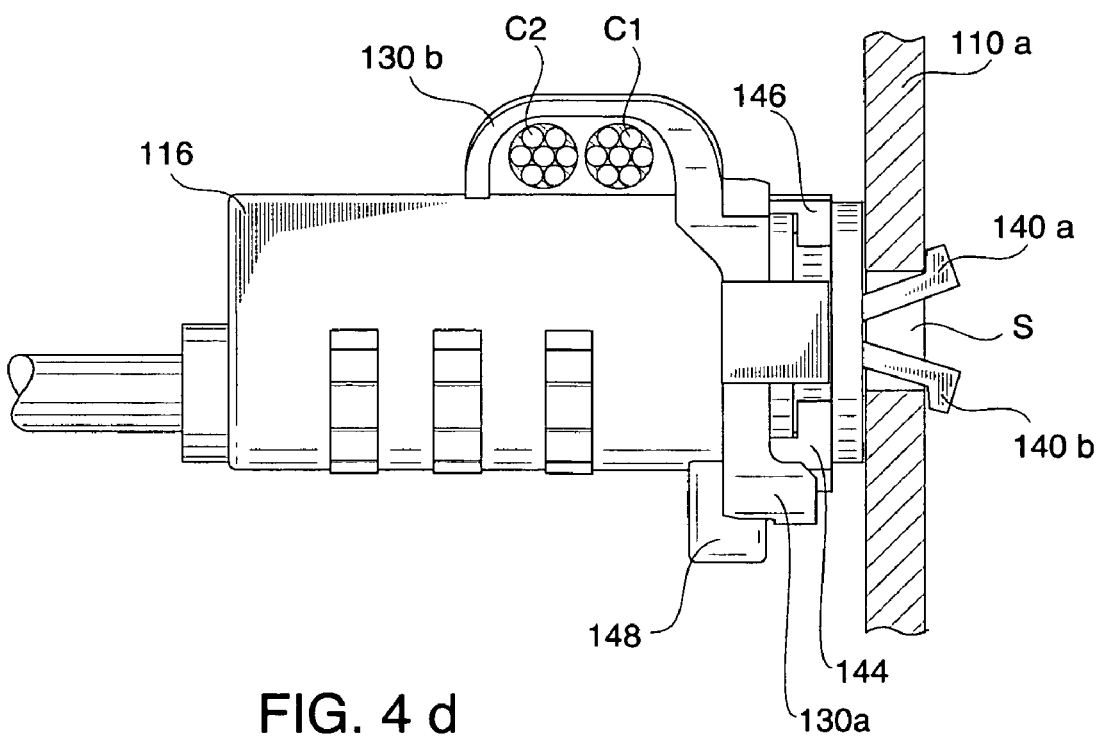

Referring now to FIG. 3 (where reference numbers are used with the prefix "1" to denote parts and components corresponding to those of the preceding embodiment), 112 designates a different model of a known combination cable lock. This lock is used in conjunction with an auxiliary component in the form of a roller or wheel 140. The wheel 140 is integrally formed with a pair pivotable legs 140a and 140b (see Figs 4c and 4d). The legs are initially in a back-to-back, closed position. By using bolt 142, the legs 140a and 140b can be pushed into a spread-apart position whereby the wheel 140 becomes fastened to the computer side-wall 10a intermediate the slot S as shown in Fig. 4a.

The lock casing 11z is provided with a latch mechanism which includes a fixed jaw 144 and a slidable jaw 146 displaceable by push-button button 148. It is thus enabled to engage and disengage the lock-casing to and from the wheel 140, at will.

As aforementioned, this type of lock is well known and need not to be described in greater detail.

Now, according to basic concept of the present invention, there is provided a cable-arresting adaptor in the form of yoke member 130, having a first portion 130a and a second portion 130b. The portion 130a is so designed as to embrace the outer part the wheel 140, without interfering with the engagement of the lock casing 112 to the wheel 140 by the jaws 144 and 146 in the normal fashion as shown in FIGS. 4c and 4d.

In operation, the cables C1 and C2 are first placed under the arc of the bridging portion 130b, the member 130 is placed over the wheel 140, and the lock casing 116 is harnessed to the wheel 140 in the conventional member.

Figure 5:
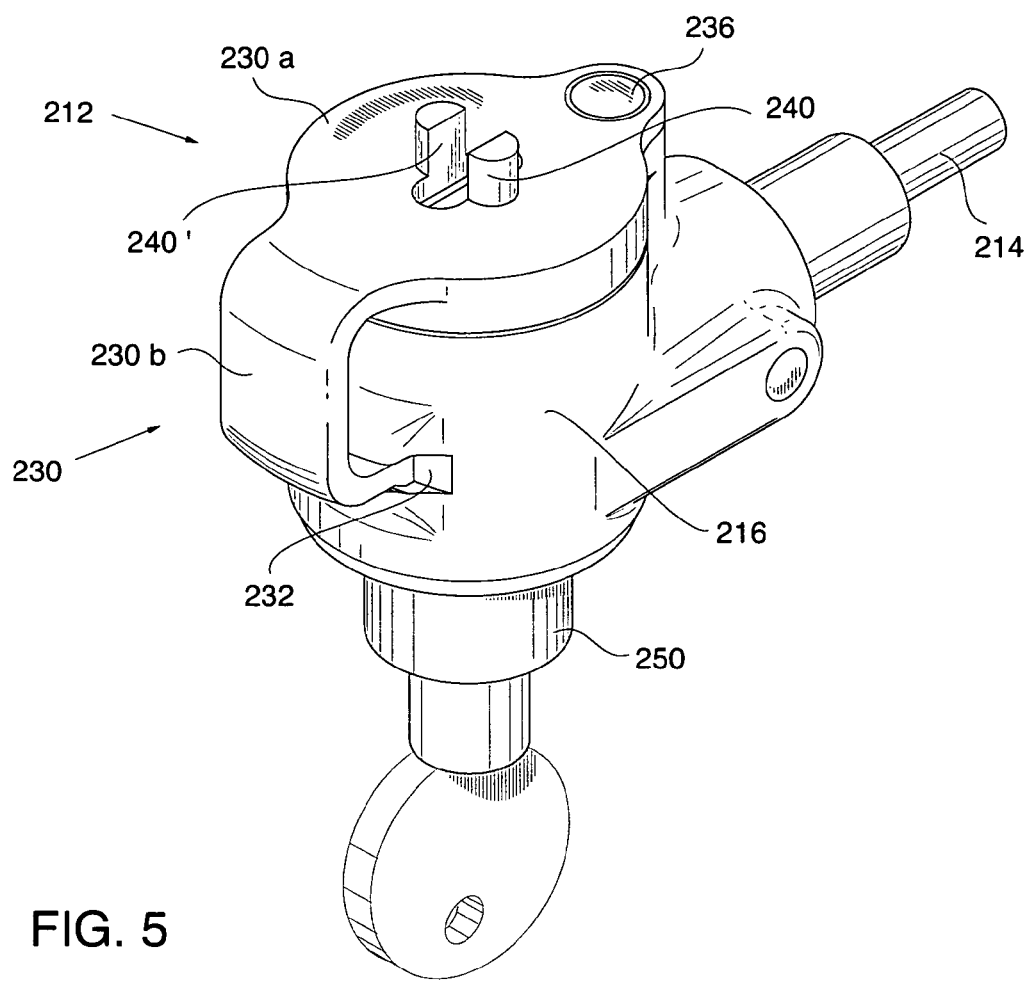
FIG. 5 is a perspective view of a third preferred embodiment of the invention.

The third exemplified embodiment of the invention depicted in FIG. 5 does not concern the adaption of conventional cable locks to the novel, additional function of securing auxiliary equipment cable, but to an originally designed product, where the lock casing and the yoke member are permanently coupled to each other.

Hence, the locking device 212 is provided with a cylinder key operated mechanism 250 (see FIG. 6b) of any type know per-se in the art. The lock casing 216 may be made of metal or reinforced plastics. Safely cable 214 is fixed to the lock casing 216 in any suitable manner.

The yoke member 230 comprises a first portion 230a and a second, bridge portion 230b beneath which the protected cables C1 and C2 are passed in the operative state of the locking device 212.

The bridge portion 230b may be formed with a bulged, dove-tail extension 232 that fits into a corresponding arcuate slot or cavity 234 when the yoke member is rotated into the cable trapping position, for extra strength (see below).

The yoke member is rotatable about axle pin 236.

The first portion 230a is formed with a slot 238 and a pair of rounded projections 240 and 240', spaced from each other and configured to fit into the slot S of the computer side wall 210a.

As seen in FIG. 6b, the locking mechanism (cylinder) 250, operable by key 252, is drivingly coupled to stem 254 carrying locking tip 256, both for displacing the tip against the bias of spring 258 and for rotating same by 90°. Pin 260 is provided for limiting the displacement of the locking cylinder 250 between the extreme positions thereof.

Figure 6A:
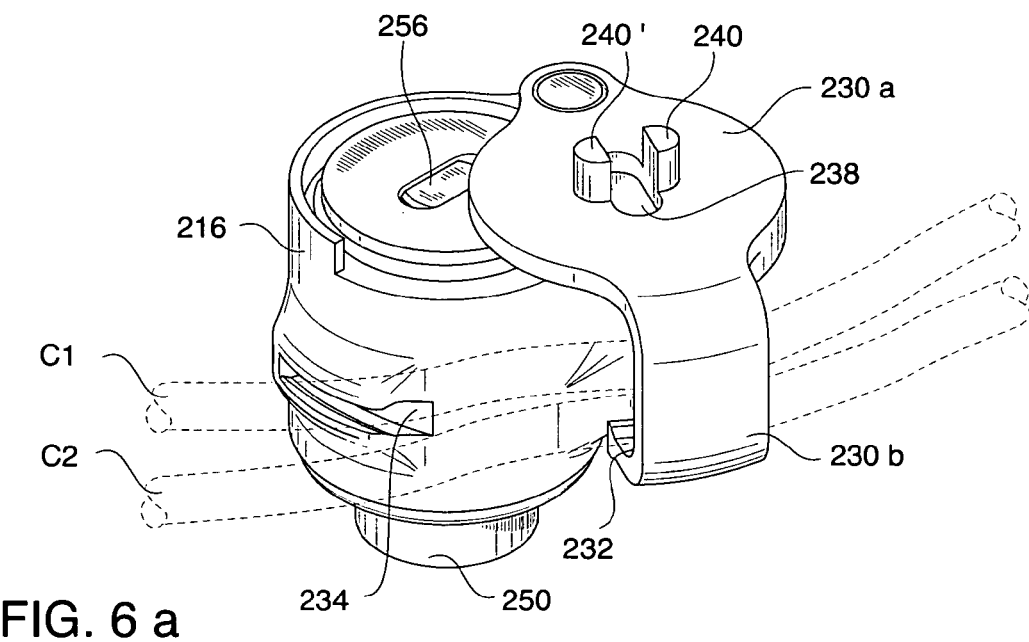
FIGS. 6a-6f show stages of completing the engagement of the lock of FIG. 5.
Figure 6:
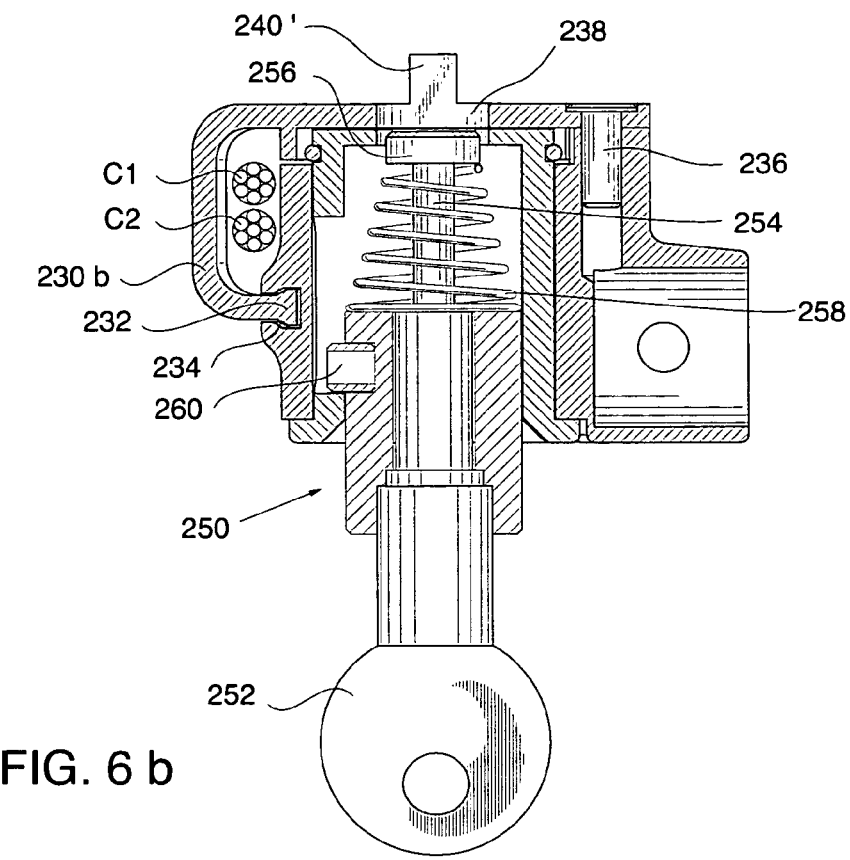
Figure 6:
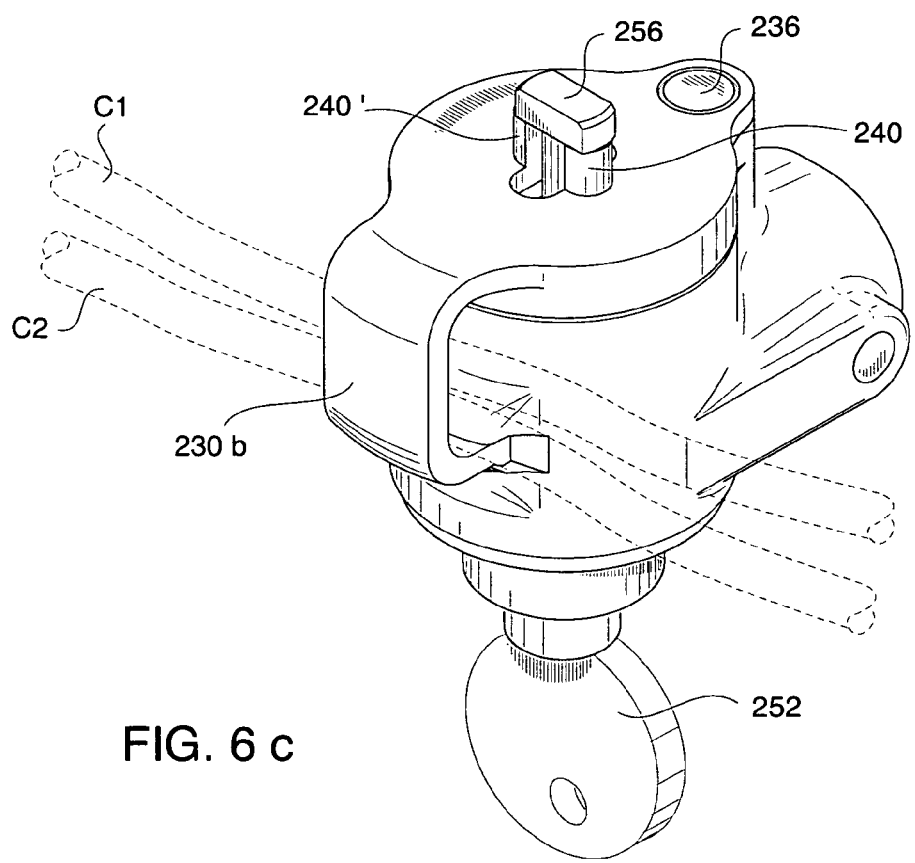

The locking operation is carried out by first threading the auxiliary cables C1 and C2 under the bridge portion 230b (FIG. 6a) and rotating the yoke member 230 back, wherein the slot 238 overlies the tip 256. The tip 256 is then pushed up and rotated by 90° as shown in FIG. 6c. This enables the insertion of the tip 256 along with the projections 240, 240' into the slot S of the computer wall 210a.

Then, the tip 256 is pushed further (if necessary) and again rotated by 90° so that it becomes positioned perpendicularly to, and behind the slot S thus completeing the engagement of the locking device to the computer wall 210a (FIG. 6f).

The lock casing 216 as a whole as well as the yoke member 230, are prevented from being turned one way or the other because of the projections 240 and 240' which are nested within the designated slot S.

It has been thus established that the present invention offers a neat and low-cost solution to the need of protecting, incidentally to the protection of the computer (or other valuable devices) against theft, all kinds of additional items which are actually connected to the computer by electric cables. The invention lends itself to be easily tailored to fit most kinds and models of presently used cable locks, or as a stand-alone device.

Those skilled in the art, that the invention has been described hereabove with reference to certain examples and specific embodiments. However, these are not the only examples and embodiments in which the invention may be practiced. Indeed, various modifications may be made to the above-described examples and embodiments without departing from the intended spirit and scope of the present invention, and it is intended that all such modifications be included within the scope of the following claims.

What is claimed is:

1. An anti-theft locking device of the type comprising a lock casing connectable on the one hand to an immovable object by a safety cable, and on the other hand to a protected object intermediate a designated slot formed in a side wall of the protected object, and a locking mechanism for selectively engaging and disengaging the lock casing to and from said side wall, said locking device comprising:

a separate yoke-member including a first portion configured when the lock casing is in an engaged state to be entrapped between the lock casing and the side wall, and a second portion bridging over the lock casing and forming an enclosed hollow thereunder, and when the lock casing is in an unengaged state, said first portion is no longer entrapped between the lock casing and the side wall and the enclosed hollow ceases to exist when the yoke-member is separated from the lock casing, wherein the first portion of the yoke-member loosely fits over a proximal portion of the lock casing, and wherein the locking mechanism is a combination type and the lock casing comprises a latch arrangement adapted to be coupled to a wheel member attachable to said designated slot, said first portion of the yoke member being adapted to be coupled to the wheel member.

2. The device as claimed in claim 1 wherein the yoke-member is coupled to the lock casing in the engaged state.

3. The device as claimed in claim 2 wherein the yoke member is pivotally coupled to the lock casing by the first portion thereof, the locking mechanism being a cylinder, key-operated type, drivingly coupled to a T-shaped tip which is adapted to be inserted into the designated slot and rotated thereinside by less than 180°, at least one projection being formed adapted to be inserted into the slot simultaneously with the tip.

4. The device as claimed in claim 3 wherein the insertion of the tip into the slot is effected by pushing the cylinder by a key.

5. An anti-theft locking device of the type comprising a lock casing connectable on the one hand to an immovable object by a safety cable, and on the other hand to a protected object intermediate a designated slot formed in a side wall of the protected object, and a locking mechanism for selectively engaging and disengaging the lock casing to and from said side wall, said locking device comprising:

a separate yoke-member including a first portion configured when the lock casing is in an engaged state to be entrapped between the lock casing and the side wall, and a second portion bridging over the lock casing and forming an enclosed hollow thereunder, and when the lock casing is in an unengaged state, said first portion is no longer entrapped between the lock casing and the side wall and the enclosed hollow ceases to exist when the yoke-member is separated from the lock casing, wherein the first portion of the yoke-member loosely fits over a proximal portion of the lock casing, wherein the proximal portion of the lock casing is circular and the first portion of the yoke-member is ring-shaped, and wherein the locking mechanism is a combination type.

6. The device as claimed in claim 5, wherein yoke-member is coupled to the lock casing in the engaged state.

* * * * *